United States Patent
Goldman et al.

(10) Patent No.: US 8,023,634 B2
(45) Date of Patent: Sep. 20, 2011

(54) AUTODIALER FLOW CONTROL

(75) Inventors: Stuart O. Goldman, Scottsdale, AZ (US); Richard E. Krock, Naperville, IL (US); Karl F. Rauscher, Emmaus, PA (US); James P. Runyon, Wheaton, IL (US)

(73) Assignee: Alcatel Lucent, Paris (FR)

( * ) Notice: Subject to any disclaimer, the term of this patent is extended or adjusted under 35 U.S.C. 154(b) by 1250 days.

(21) Appl. No.: 11/452,690

(22) Filed: Jun. 14, 2006

(65) Prior Publication Data

US 2007/0291925 A1    Dec. 20, 2007

(51) Int. Cl.
*H04M 7/00* (2006.01)

(52) U.S. Cl. ............... 379/221.03; 379/266.07; 379/309

(58) Field of Classification Search ............... 379/32.01, 379/209.01, 216.01, 265.02, 40, 221.01–221.07, 379/266.01–266.09
See application file for complete search history.

(56) References Cited

U.S. PATENT DOCUMENTS

| | | | |
|---|---|---|---|
| 3,793,490 A * | 2/1974 | Karras | 379/136 |
| 5,327,490 A | 7/1994 | Cave | |
| 5,570,419 A * | 10/1996 | Cave et al. | 379/266.08 |
| 5,799,254 A | 8/1998 | Karmi et al. | |
| 6,275,572 B1 | 8/2001 | Higuchi et al. | |
| 6,987,848 B1 | 1/2006 | Choudhury et al. | |

FOREIGN PATENT DOCUMENTS

| | | |
|---|---|---|
| EP | 1 345 398 A1 | 9/2003 |
| JP | 2001 197188 | 7/2001 |

* cited by examiner

*Primary Examiner* — Ahmad F Matar
*Assistant Examiner* — Oleg Asanbayev
(74) *Attorney, Agent, or Firm* — Fay Sharpe LLP

(57) ABSTRACT

A method for regulating a call placement rate (CPR) of an autodialer (AD) (100) includes: measuring a time delay between a first event and a second event; and, adjusting the CPR of the AD (100) in response to the measured time delay.

16 Claims, 2 Drawing Sheets

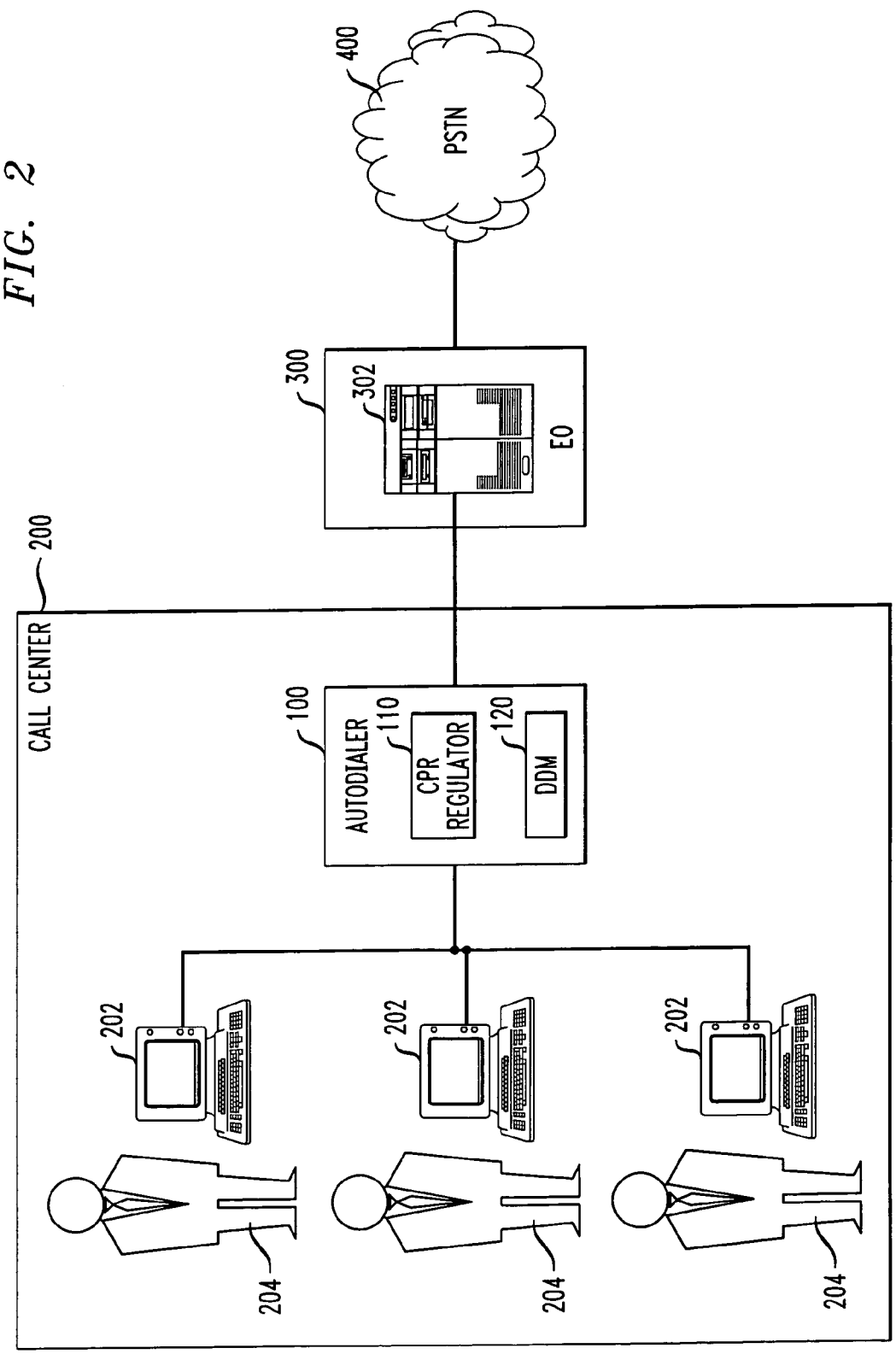

AUTODIALER FLOW CONTROL

FIELD

The present inventive subject matter relates to the telecommunication arts. One particular application is found in conjunction with autodialers and/or predictive dialers, and the specification makes particular reference thereto. However, it is to be appreciated that aspects of the present inventive subject matter are also amenable to other like applications.

BACKGROUND

In general, autodialers and predictive dialers are known in the art. Basically, an autodialer (AD) is an electronic device that automatically places telephone calls to selected telephone numbers over a telecommunications network, for example, such as a public switched telephone network (PSTN). A predictive dialer (PD) is essentially a particular type of AD that uses one or more predictive algorithms, e.g., to regulate various aspects of call placement or other behaviors of the PD. In other words, PDs are essentially a subset of ADs. Accordingly, when referring to ADs herein, it is to be understood that such references are intended to include PDs as well.

With reference to FIG. 1, commonly an AD 10 is used by a call center (CC) 20 or other like facility to automatically place telephone calls to selected telephone numbers and/or targeted parties. In a typical example, a telemarketing company or other organization may use the CC 20 and/or AD 10 to automatically place a significant volume or number of marketing calls, survey calls or other similar telephone calls to the telephone numbers associated with a targeted demographic. Commonly, the CC 20 is served by an end office (EO) 30 or other telecommunications switching facility that provides the CC 20 access to the PSTN 40 or other telecommunications network over which the telephone calls are placed. As shown, the EO 30 is commonly equipped with a telecommunications switch 32, e.g., a class 5 switch such as Lucent Technologies 5ESS or another similar telecommunications switch (be it a hardswitch, a softswitch or otherwise), and the AD 10 is operatively connected to the switch 32 in the usual manner as is known in the art.

Commonly, the AD 10 places a plurality of calls simultaneously and/or in rapid succession to keep a calling campaign progressing as quickly as possible. Often, the CC 20 is provisioned with a plurality of workstations 22 that are operatively connected to the AD 10. As shown, each workstation 22 is manned by a CC operator or agent 24. Accordingly, e.g., when a call placed by the AD 10 is answered by or otherwise connected to the called party, then that call is also routed and/or connected to the workstation 22 of the next available agent 24 at the CC 20. In this manner, the agent 24 receiving the call may communicate with and/or otherwise service the particular called party to which the call was placed.

Often, the CC 20 is interested in connecting called parties to agents 24 as rapidly and/or efficiently as possible to maximize productivity and/or the use of agent time or manpower. Accordingly, there is generally the desire to have the AD 10 place calls as rapidly as its capabilities allow. However, if left unchecked, the rate or flow of placed calls from the AD 10 may at times overload the switch 32 and/or the EO 30 serving the CC 20. That is to say, generally, the switch 32 and/or the EO 30 can only handle or support a limited or otherwise finite amount of call traffic at any given time, and in addition to serving the CC 20, the EO 30 typically also serves other telephone service subscribers, e.g., having customer premises equipment (CPE) and/or other end user telecommunication devices that are operatively connected to the switch 32 in the usual manner as is known in the art. Accordingly, e.g., at peak calling hours, the switch 32 and/or EO 30 may already be handling or otherwise processing a significant volume or amount of call traffic, and if at this time the AD 10 at the CC 20 were to be left unchecked (i.e., allowed to place calls as rapidly its capabilities permitted), then the switch 32 and/or EO 30 could be overloaded or pushed to or near the limit of the volume of calls that it is capable of handling at any given time, thereby potentially diminishing the quality and/or availability of service to other subscribers and/or the CC 20 itself. While the present example illustrates the problem from the viewpoint of the originating EO 30 serving the CC 22, likewise, the same or a similar problem may be experienced at a terminating EO or other network node, e.g., when a particular calling campaign targets telephone numbers that are served by the same terminating EO or targets called parties that are otherwise clustered together or served by the same or a limited number of network facilities. In any event, however, previously developed ADs have not been adequately equipped or provisioned to suitably adjust their call placement rate or flow to accommodate or alleviate call traffic congestion experienced in the originating EO, the terminating EO or nodes elsewhere in the network.

Accordingly, a new and improved AD and/or autodialing method is disclosed that overcomes the above-referenced problems and others.

SUMMARY

In accordance with one embodiment, a method for regulating a call placement rate of an autodialer includes: measuring a time delay between a first event and a second event; and, adjusting the call placement rate of the autodialer in response to the measured time delay.

In accordance with another embodiment, an autodialer includes: delay measuring means for measuring a time delay between a first event and a second event; and, call rate adjusting means for adjusting a call placement rate of the autodialer in response to the time delay measured by the delay measuring means.

In accordance with another embodiment, a method is provided for regulating a call placement rate of an autodialer operatively connected to an originating end office which is part of a telecommunications network. Suitably, the originating end office provides the autodialer access to the telecommunications network. The method includes: detecting a level of call congestion at a node of the telecommunications network; and, adjusting the call placement rate of the autodialer in response to the detected level of call congestion.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

FIG. 2 is a block diagram illustrating an exemplary implementation of an AD suitable for practicing aspects of the present inventive subject matter.

DETAILED DESCRIPTION

Figure 1:
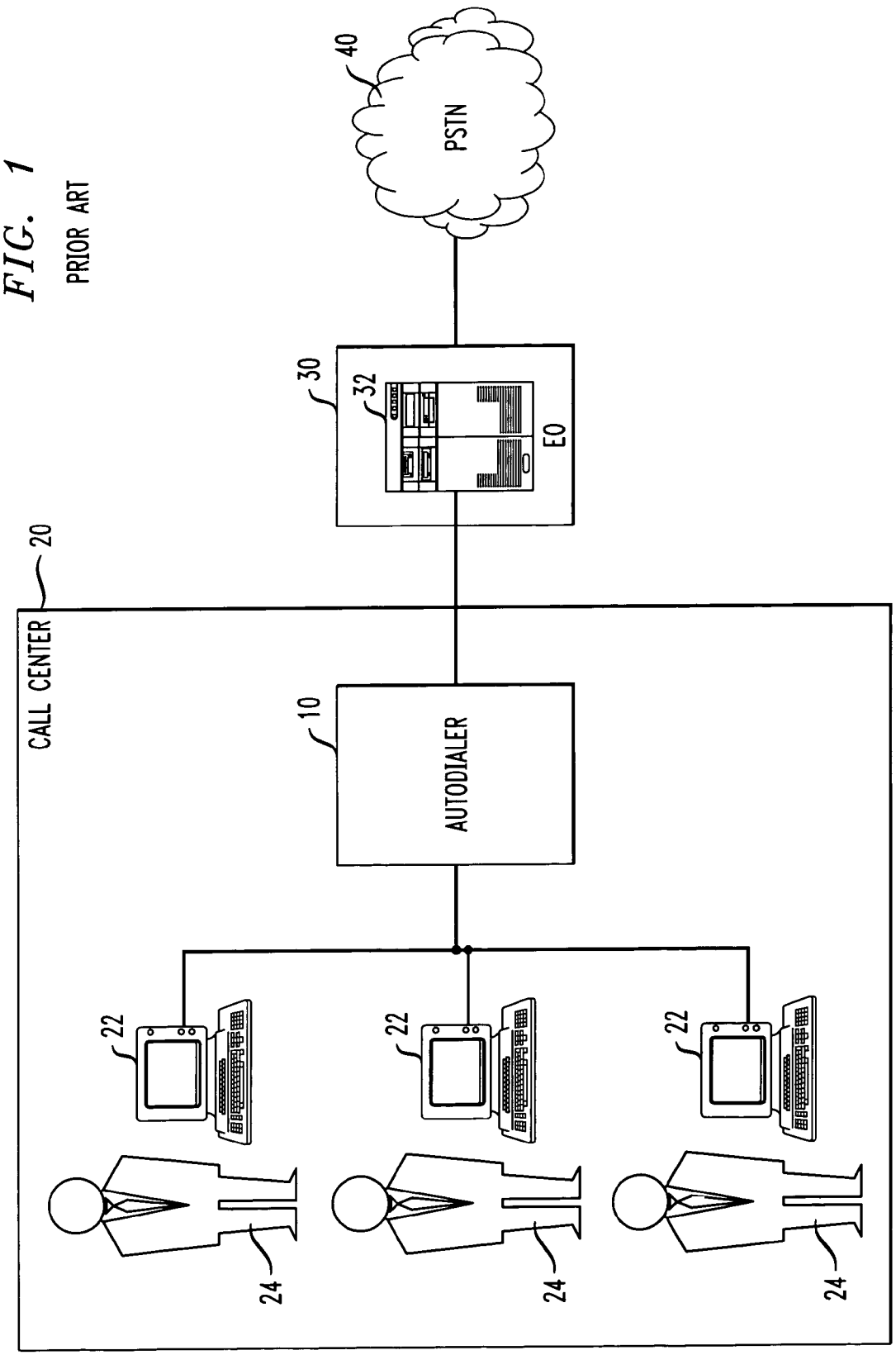
FIG. 1 is a block diagram illustrating a conventional AD implemented in a public switch telephone network.

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the embodiment(s) presented herein.

With reference to FIG. 2, an autodialer (AD) 100 is used by a call center (CC) 200 or other like facility to automatically place telephone calls to selected telephone numbers and/or targeted parties. For example, a telemarketing company or other organization optionally uses the CC 200 and/or AD 100 to automatically place a significant volume or number of marketing calls, survey calls or other similar telephone calls to the telephone numbers associated with a targeted demographic. Suitably, the CC 200 is served by an end office (EO) 300 or other telecommunications switching facility that provides the CC 200 access to a public switched telephone network (PSTN) 400 or other telecommunications network over which the telephone calls are placed. As shown, the EO 300 is equipped with a telecommunications switch 302, e.g., a class 5 switch such as Lucent Technologies 5ESS or another similar telecommunications switch (be it a hardswitch, a softswitch or otherwise), and the AD 100 is operatively connected to the switch 302 in the usual manner as is known in the art.

Optionally, the AD 100 places a plurality of calls simultaneously and/or in rapid succession to keep a calling campaign progressing as quickly as possible. Suitably, however, a dialing rate or call placement rate (CPR) of the AD 100 is controlled or regulated by a CPR regulator 110. For example, the regulator 110 controls the CPR so as to place calls as rapidly as possible without overloading the originating EO 300 or its associated switch 302. Optionally, the regulator 110 controls the CPR so as to place calls as rapidly as possible without overloading other network nodes and/or facilities, e.g., a terminating EO or switch or intermediate network facilities or nodes.

Suitably, the CC 200 is provisioned with a plurality of workstations 202 that are operatively connected to the AD 100. As shown, each workstation 202 is manned by a CC operator or agent 204. Accordingly, e.g., for each call placed by the AD 100 or answered by or otherwise connected to a called party, the call is also routed and/or connected to the workstation 202 of the next available agent 204 at the CC 200. In this manner, the agent 204 receiving the call may communicate with and/or otherwise service the particular called party to which the call was placed. However, if at the time the called party answers the call, there are no agents 204 which are currently available (i.e., they are all on other calls or otherwise indisposed), then the called party may experience a delay for some time until an agent 204 becomes available to handle the call. Optionally, the CPR regulator 110 controls the CPR of the AD 100 so as maximize the CPR while minimizing the number of occurrences and/or the duration of the aforementioned delay, nominally referred to herein as agent connection delay (ACD).

Generally, the switch 302 and/or the EO 300 are equipped to handle or support a limited or otherwise finite amount of call traffic at any given time, and in addition to serving the CC 200, the EO 30 also optionally serves other telephone service subscribers, e.g., having customer premises equipment (CPE) and/or other end user telecommunication devices that are operatively connected to the switch 32 in the usual manner. Accordingly, e.g., at peak calling hours, the switch 302 and/or EO 300 may already be handling or otherwise processing a significant volume or amount of call traffic, and if at this time the AD 100 at the CC 200 were to be left unchecked (i.e., allowed to place calls as rapidly as its capabilities permitted), then the switch 302 and/or EO 300 could be overloaded or pushed to or near the limit of the volume of calls that it is capable of handling at any given time, thereby potentially diminishing the quality and/or availability of service to other subscribers and/or the CC 20 itself.

Suitably, the AD 100 is equipped or otherwise provisioned to detect such overload or near overload conditions at the originating EO 300 or switch 302. Accordingly, when it is detected that the EO 300 or switch 302 is at or near the upper limit of its call handling capacity (i.e., at or near an overload), then the CPR of the AD 100 is optionally dropped, lessened or otherwise adjusted or regulated, e.g., by the regulator 110, to alleviate the burden on the EO 300 and/or switch 302.

For example, as illustrated, the AD 100 is optionally equipped or provisioned with a delay detection module (DDM) 120 or other like function or element. Optionally, the DDM 120 measures and/or detects the delay between the time an initial call placement signal (i.e., off hook signal, line seizure signal or the like) is sent from the AD 100 to the EO 300 or switch 302 and the time at which a dial tone or the like is returned or otherwise received by the AD 100 from the EO 300 or switch 302. Notably, this time delay (which shall be referred to for simplicity herein as a dial tone delay (DTD)) is indicative of the call load being handled by the EO 300 or switch 302. That is to say, generally, the EO 300 and/or associated switch 302 are provisioned to complete the processing or handling of existing calls before initiating new ones. Accordingly, new calls commonly experience a DTD until resources in the EO 300 and/or switch 302 are freed up to be used for the new calls. For example, a longer DTD generally means that the EO 300 and/or the switch 302 are relatively more busy or closer to the upper limit of their call handling capacity, and a shorter DTD generally means that the EO 300 and/or switch 302 are relatively less busy or further from the upper limit of their call handling capacity.

Suitably, in response to the DTD measured and/or detected by the DDM 120, the CPR regulator 110 regulates and/or otherwise controls the CPR of the AD 100. For example, when the DTD exceeds a set or adjustable or otherwise determined threshold, the CPR is reduced accordingly. Similarly, when the DTD is below a set or adjustable or otherwise determined threshold, the CPR is raised accordingly. Optionally, the CPR is, e.g., successively, reduced and/or increased as the case may be incrementally until the DTD satisfies the respective threshold. In one suitable embodiment, a single threshold may be used as a target value which represents what is deemed to be an optimal DTD for a particular application, or alternately, a pair of thresholds may be used to define a range of values which represent what is deemed to be an acceptable range of DTDs for a particular application. Optionally, the DTD is measure for each line used by the AD 100 or for each call placed by the AD 100, or alternately, a representative sample is employed. Optionally, a mean, average or other weighted combination of measured or detected DTDs is compared against the respective threshold.

In one suitable embodiment, the CPR is regulated by adjusting or otherwise altering a guard time (GT) used by the AD 100. Generally, the guard time is the amount of time a line remains inactive (i.e., on hook) between uses. That is to say, for a given line used by the AD 100, the GT is the time between an on hook or other like signal associated with the termination of a first call and an subsequent off hook, line seizure or other like signal that initiates a second call following the first call. Commonly, the GT is used to ensure that the EO 300 and/or switch 302 detect or otherwise recognize the sequence of signals as the termination of the first call and initiation of the second call rather than it merely being a hook flash. In any event, increasing the GT used by the AD 100 effectively reduces the CPR of the AD 100 and reducing the GT used by the AD 100 effectively increases the CPR of the AD 100.

For example, the AD 100 may under normal conditions be provisioned with a 200 millisecond (mS) GT. However, if the DTD measured and/or detected by the DDM 120 exceeds a given threshold value (e.g., 300 mS), then the CPR regulator 110 increases the GT used by the AD 100 by some set or otherwise determined amount (e.g., 5 mS). If after a given period (e.g., 1 second) with the AD 100 using this new GT (i.e., 205 mS), the threshold is still exceeded by the DTD, then the GT is again increased. This cycle optionally continues until the DTD reaches or falls below the threshold value. Likewise, so long as the DTD measured and/or detected by the DDM 120 remains beneath the threshold, then the CPR regulator 110 decreases the GT used by the AD 100 by some set or otherwise determined amount, and if after a given period with the AD 100 using the new GT, the threshold is still not exceeded, then the GT is again decreased. This cycle optionally continues until the threshold is reached by the DTD or the GT reaches its normal operational limit (i.e., 200 mS). Of course, it is to be appreciated that the particular values used above are merely examples, and that other values may be used as deemed appropriate for the specific circumstances surrounding a given application.

While the foregoing addresses the problem of congestion at the originating EO 300 serving the CC 200, the same or a similar problem may be experienced at a terminating EO or other network node, e.g., when a particular calling campaign targets telephone numbers that are served by the same terminating EO or targets called parties that are otherwise clustered together or served by the same or a limited number of network facilities. Accordingly, to address the issue at a terminating EO or switch or at intermediate network nodes or facilities, the AD 100 is optionally equipped or provisioned to detect congestion or overload or near overload conditions at terminating EOs and/or intermediate nodes or facilities within the PSTN 400. Accordingly, when it is detected that the terminating EO or associated switch or other intermediate node or facility is at or near an upper limit of its call handling capacity (i.e., at or near an overload), then the CPR of the AD 100 is optionally dropped, lessened or otherwise adjusted or regulated, e.g., by the regulator 110, to alleviate the burden or call congestion.

In one suitable embodiment, the DDM 120 optionally also measures and/or detects post dial delay (PDD) and the CPR of the AD 100 is adjusted or regulated in response thereto. PDD is generally the delay between the time when the AD 100 dials the last digit or otherwise completes dialing for a call being placed thereby and the time when a ring back signal or the like is returned to or otherwise received by the AD 100. Notably, the PDD is indicative of the congestion at the terminating EO or switch or other intermediate network node or facility. For example, a longer PDD generally means that the terminating EO and/or intermediate facilities are relatively more busy or closer to the upper limit of their call handling capacities, and a shorter PDD generally means that the terminating EO and/or intermediate facilities are relatively less busy or further from the upper limit of their call handling capacities.

Suitably, in response to the PDD measured and/or detected by the DDM 120, the CPR regulator 110 regulates and/or otherwise controls the CPR of the AD 100. For example, when the PDD exceeds a set or adjustable or otherwise determined threshold, the CPR is reduced accordingly. Similarly, when the PDD is below a set or adjustable or otherwise determined threshold, the CPR is raised accordingly. Optionally, the CPR is, e.g., successively, reduced and/or increased as the case may be incrementally until the PDD satisfies the respective threshold. In one suitable embodiment, a single threshold may be used as a target value which represents what is deemed to be an optimal PDD for a particular application, or alternately, a pair of thresholds may be used to define a range of values which represent what is deemed to be an acceptable range of PDDs for a particular application. Optionally, the PDD is measure for each line used by the AD 100 or for each call placed by the AD 100, or alternately, a representative sample is employed. Optionally, a mean, average or other weighted combination of measured or detected PDDs is compared against the respective threshold.

Suitably, the CPR of the AD 100 is regulated by adjusting or otherwise altering the GT used by the AD 100 in response to the measured or detected PDD, e.g., in the same or a similar way as described above with reference to the DTD. Optionally, an algorithm or process used by the regulator 110 to control or adjust the CPR of the AD 100 is a function of or responsive to both the measured or otherwise detected DTD and PDD values, with the relative influences of each being set, selected or otherwise determined to achieve a desired result or balance for the particular application at hand.

In yet another suitable embodiment, the CPR of the AD 100 is regulated by the CPR regulator 110 or otherwise in response to the ACD, e.g., which may also be measured and/or detected by the DDM 120. That is to say, optionally, when the ACD exceeds a set or adjustable or otherwise determined threshold, the CPR is reduced accordingly. Similarly, when the ACD is below a set or adjustable or otherwise determined threshold, the CPR is raised accordingly. Optionally, the CPR is, e.g., successively, reduced and/or increased as the case may be incrementally until the ACD satisfies the respective threshold. In one suitable embodiment, a single threshold may be used as a target value which represents what is deemed to be an optimal ACD for a particular application, or alternately, a pair of thresholds may be used to define a range of values which represent what is deemed to be an acceptable range of ACDs for a particular application. Optionally, the ACD is measure for each line used by the AD 100 or for each call placed by the AD 100, or alternately, a representative sample is employed. Optionally, a mean, average or other weighted combination of measured or detected ACDs is compared against the respective threshold.

Suitably, the CPR of the AD 100 is regulated by adjusting or otherwise altering the GT used by the AD 100 in response to the measured or detected ACD, e.g., in the same or a similar way as described above with reference to the DTD. Optionally, an algorithm or process used by the regulator 110 to control or adjust the CPR of the AD 100 is a function of or responsive to any one or more of the measured or otherwise detected DTD, PDD and/or ACD values, with the relative influences of each being set, selected or otherwise determined to achieve a desired result or balance for the particular application at hand.

It is to be appreciated that in connection with the particular exemplary embodiments presented herein certain structural and/or function features are shown and/or described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components shown and/or described herein may have their functionality suitably implemented via hardware, software, firmware or a combination thereof. Additionally, it is to be appreciated that certain elements shown and/or described herein as incorporated together may under suitable circumstances be stand-alone elements or otherwise divided. Similarly, a plurality of particular functions shown and/or described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for regulating a call placement rate of an autodialer comprising multiple communication lines, said method comprising:
    (a) measuring at least one time delay, each time delay being between a first event and a second event, wherein the at least one time delay includes a first time delay for which the first event is marked by an off hook signal being sent by the autodialer and the second event is marked by a return of dial tone to the autodialer;
    (b) adjusting the call placement rate of the autodialer in response to the at least one measured time delay; and
    (c) adjusting a guard time used by the autodialer in response to at least one measured time delay, said guard time being the time between when the autodialer sends an on hook signal associated with an end of a first call and when the autodialer sends an off hook signal associated with an initiation of a second call following the first call on a single communication line;
    wherein the call placement rate dictates the time between placing phone calls using the multiple communication lines of the autodialer; and
    wherein the guard time ensures that the single communication line is on hook for an amount of time sufficient to compensate for call congestion at an end office or public switch serving the autodialer.

2. The method of claim 1, wherein the at least one time delay includes a second time delay for which the first event is marked by an end of the autodialer dialing a telephone number and the second event is marked by a return of a ring back signal to the autodialer for measuring a second time delay in (a).

3. The method of claim 1, wherein the at least one time delay includes a second time delay for which the first event is marked by a called party answering a call placed by the autodialer and the second event is marked by the call being connected to a workstation operatively connected to the autodialer for measuring a second time delay in (a).

4. The method of claim 1, wherein step (b) comprises:
    increasing the guard time when the corresponding measured time delay exceeds a threshold level.

5. The method of claim 1, wherein step (b) comprises:
    decreasing the guard time when the corresponding measured time delay is below a threshold level.

6. An autodialer having multiple communication lines comprising:
    delay measuring means for measuring at least one time delay, each time delay between a first event and a second event, wherein the at least one time delay includes a first time delay for which the first event is marked by an off hook signal being sent by the autodialer and the second event is marked by a return of dial tone to the autodialer; and,
    call rate adjusting means for adjusting a call placement rate of the autodialer in response to the at least one time delay measured by the delay measuring means;
    wherein the call rate adjusting means adjusts the call placement rate of the autodialer by adjusting a guard time used by the autodialer in response to at least one time delay measure by the delay measuring means, said guard time being the time between when the autodialer sends an on hook signal associated with an end of a first call and when the autodialer sends an off hook signal associated with an initiation of a second call following the first call on a single communication line;
    wherein the call placement rate dictates the time between placing phone calls using the multiple communication lines of the autodialer; and
    wherein the guard time ensures that the single communication line is on hook for an amount of time sufficient to compensate for call congestion at an end office or public switch serving the autodialer.

7. The autodialer of claim 6, wherein the at least one time delay includes a second time delay for which the first event is marked by an end of the autodialer dialing a telephone number and the second event is marked by a return of a ring back signal to the autodialer for the delay measuring means measuring a second time delay.

8. The autodialer of claim 6, wherein the at least one time delay includes a second time delay for which the first event is marked by a called party answering a call placed by the autodialer and the second event is marked by the call being connected to a workstation operatively connected to the autodialer for the delay measuring means measuring a second time delay.

9. The autodialer of claim 6, wherein the call rate adjusting means increases the guard time when the corresponding time delay measured by the delay measuring means exceeds a threshold level.

10. The autodialer of claim 6, wherein the call rate adjusting means decreases the guard time when the corresponding time delay measured by the delay measuring means is below a threshold level.

11. A method for regulating a call placement rate of an autodialer having multiple phone lines at a call center operatively connected to an originating end office which is part of a telecommunications network, said originating end office providing the autodialer access to said telecommunications network, said method comprising:
    (a) detecting a level of call congestion at a node of the telecommunications network away from the call center by measuring at least one time delay, each time delay being between a first event and a second event, wherein the at least one time delay includes a first time delay for which the first event is marked by an end of the autodialer dialing a telephone number and the second event is marked by a return of a ring back signal to the autodialer and a second time delay for which the first event is marked by an off hook signal being sent by the autodialer and the second event is marked by a return of dial tone to the autodialer;

(b) adjusting the call placement rate of the autodialer in response to the detected level of call congestion;

(c) adjusting a guard time used by the autodialer in response to at least one measured time delay, the guard time being the time between when the autodialer sends an on hook signal associated with an end of a first call and when the autodialer sends an off hook signal associated with an initiation of a second call following the first call on a single communication line;

wherein the call placement rate dictates the time between placing phone calls using the multiple communication lines of the autodialer; and wherein the guard time ensures that the single communication line is on hook for an amount of time sufficient to compensate for call congestion at an end office or public switch serving the autodialer.

12. The method of claim 11, wherein the node at which call congestion is detected is the originating end office.

13. The method of claim 11, wherein the call placement rate is adjusted to alleviate call congestion at the node when the detected level exceeds a threshold.

14. The method of claim 11, wherein the at least one time delay includes a third time delay for which the first event is marked by a called party answering a call placed by the autodialer and the second event is marked by the call being connected to a workstation operatively connected to the autodialer.

15. The method of claim 1, wherein the adjusting in (b) is with respect to a mean, average or other weighted combination of measurements of a measured time delay.

16. The autodialer of claim 6, wherein the call rate adjusting means adjusts the call placement rate of the autodialer with respect to a mean, average or other weighted combination of measurements of a measured time delay.

* * * * *